Inventor
Herbert Brandt
by Albert T. Jacks
Attorney

United States Patent Office 3,181,601
Patented May 4, 1965

3,181,601
REGENERATIVE HEAT EXCHANGERS
Herbert Brandt, Rothemuhle uber Olpe, Westphalia, Germany, assignor to Apparatebau Rothemuhle Dr. Brandt, & Co., Westphalia, Germany, a company of Germany
Filed Feb. 16, 1961, Ser. No. 89,815
Claims priority, application Great Britain, Dec. 5, 1960, 41,801/60
12 Claims. (Cl. 165—4)

This invention relates to regenerative heat exchangers of the kind in which a substantially cylindrical regenerative heat exchange member, hereinafter referred to as a regenerator, is disposed stationary within an outer casing which has gas inlet and gas outlet means at its ends or otherwise suitably located whereby hot gas may be led to the regenerator and passed in an axial direction through passages in the regenerator so as to give up heat from the said hot gas to a mass of plates or tubes which form the passages. Also disposed within the casing, and at each axial end of the regenerator, are rotatable duct members provided with means to lead air to one of the said duct members and from the other said duct member after passing in an axial direction through the regenerator, the said duct members rotating co-axially in relation to the stationary regenerator and having openings which pass over the end surfaces of the regenerator during such rotation, the opening or openings in one of the two duct members being disposed in mirror-image relation to the opening or openings in the other duct member so that air may flow direct from one duct member, through part of the regenerator mass to pick up heat from said mass and then into the other duct member.

Usually the said openings in the duct members are of sector shape, and there may be one or more such openings in each duct member.

It is desirable that the ends of the rotatable duct members which sweep over the ends of the stationary regenerator should do so in such manner that there is the minimum amount of leakage between the duct members and the enclosing casing, and usually this has been effected by sealing members, sometimes spring-pressed, disposed at the edges of said duct openings so as to be pressed into contact with the end surfaces of the regenerator. It also has been proposed that the shaft which passes axially through the stationary regenerator and is connected to the two rotatable duct members should be in two parts provided with axially movable means to allow the two duct members and their sealing members to be retained in sealing engagement with the end surfaces of the regenerator during all phases of heat expansion.

The object of the present invention is to provide improved means for effecting and retaining a gas and air seal between the rotatable duct members and the end surfaces of the regenerator in a regenerative heat exchanger of the kind referred to.

A regenerative heat exchanger of the kind referred to is characterized in that the gas sealing means between the rotatable ducts and the stationary regenerator is provided at each rotatable duct by a sealing member for facial engagement with an end surface of the regenerator, a frame carrying the said sealing member, a gas-tight flexible and resilient expansion joint device between the rotatable duct and the said sealing member frame, swivelling joint means also between the rotatable duct and the sealing member frame, and spring means urging the sealing member frame from the air duct towards the regenerator.

One embodiment of the invention is illustrated in the accompanying drawings wherein.

Figure 1:
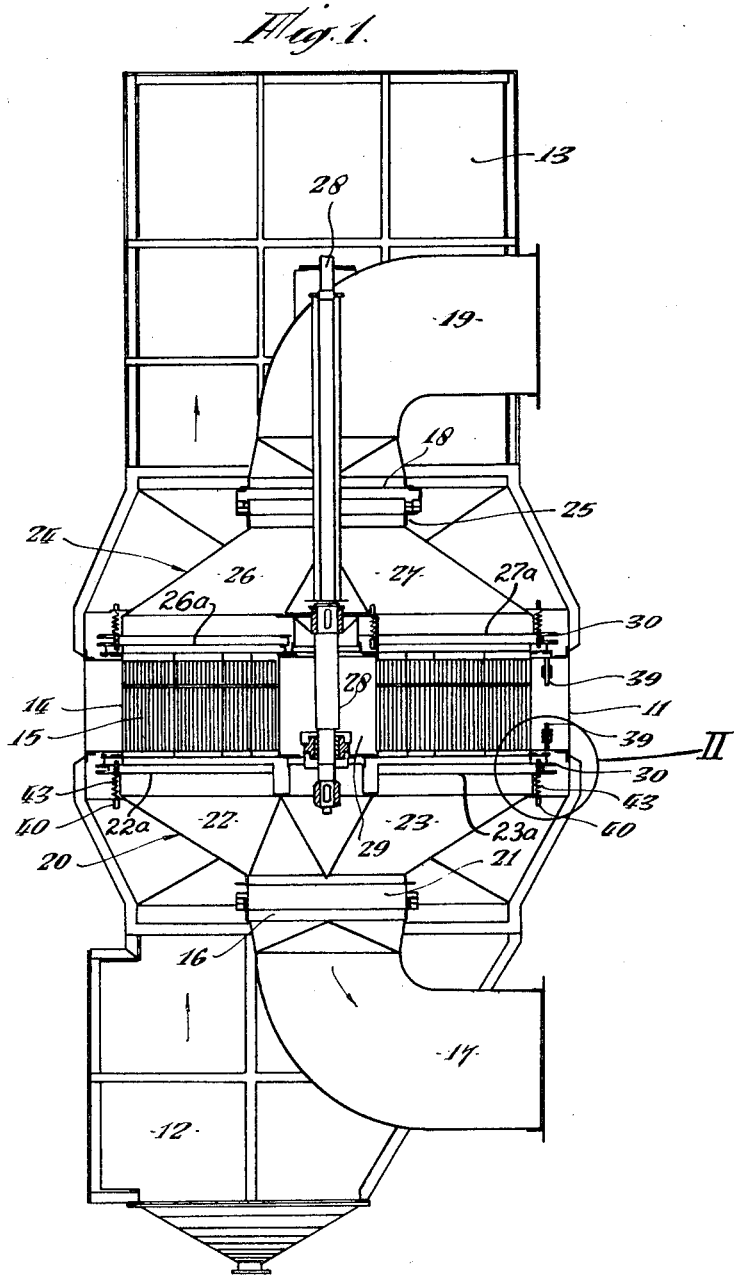
FIG. 1 is a sectional elevation of a regenerative heat exchanger.

Referring to FIG. 1, a casing 11 provides at its bottom end a chamber 12 into which hot gases, from a suitable source, are admitted by means not shown, and the casing also has at its upper end a chamber 13 from which the said gases, after giving up heat to the regenerator hereinafter referred to, are withdrawn by means not shown.

Between the chambers 12 and 13 there is a stationary cylindrical regenerator 14 which is provided with plates or tubes which provide a mass 15 which forms passages which are parallel to the axis of the regenerator and which are open at the ends of the regenerator. Thereby, the hot gas from the chamber 12 may flow through the mass 15, give up heat to the said mass, and then pass on, as cool gas, to the chamber 13.

Within the chamber 12, and co-axial with the regenerator 14, there is the open end 16 of an outlet air duct 17, whilst within the chamber 13 there is a similar open end 18 of an inlet air duct 19.

Below the regenerator 14 there is an air duct member 20 which has an axial neck 21 which is disposed in rotatable, air and gas tight, engagement with the end 16 of the air duct 17, and has ducts 22 and 23 which have sector-shaped openings 22a and 23a respectively, at their upper ends near to the bottom end face of the regenerator 14.

Similarly, above the regenerator 14 there is an air duct member 24 which has an axial neck 25 which is disposed in rotatable, air and gas tight, engagement with the end 18 of the air duct 19, and has ducts 26 and 27 which have sector-shaped openings 26a and 27a respectively, at their lower end near to the upper end face of the regenerator 14.

The bottom openings 26a and 27a respectively, of the ducts 26 and 27 are opposed, in the axial direction of the regenerator, to the upper openings 22a and 23a respectively of the ducts 22 and 23, respectively, that is, the openings 26a and 27a respectively, of the ducts 26 and 27 are disposed in mirror-image manner to the openings 22a and 23a respectively, of the ducts 22 and 23, so that air emitted from the ducts 26 and 27 will pass through the regenerator and into the ducts 22 and 23.

The two air duct members 20 and 24 are both secured to a driving shaft 28 which passes vertically through an axial opening 29 in the regenerator 14 to provide a rotation drive to the duct members in known manner.

Figure 2:
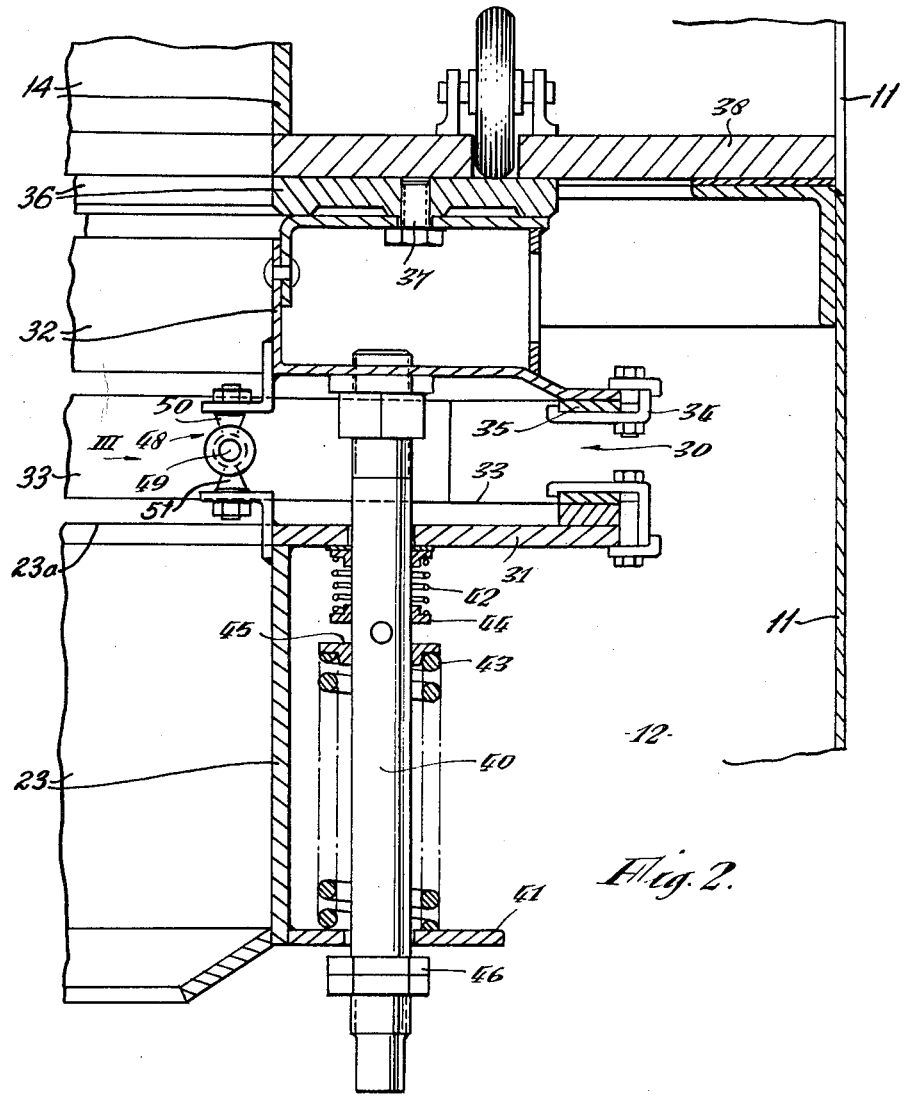
FIG. 2 is an enlarged fragmentary sectional elevation of the sealing means included in FIG. 1 and enclosed in the circle II in that figure.
Figure 3:
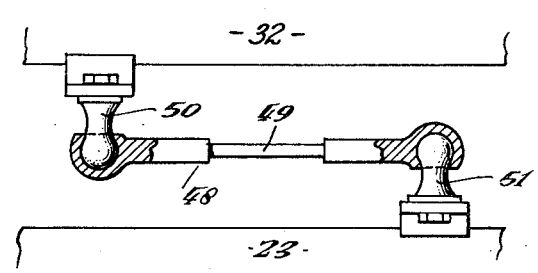
FIG. 3 is an elevation, showing a detail, looking in the direction of arrow III in FIG. 2.

It is desirable that there be no leakage of fluid between the air ducts 22, 23, 26, 27 and the gas chambers 12, 13, and for this purpose sealing assemblies 30 are disposed around the peripheries of the openings 22a, 23a, 26a and 27a of the ducts 22, 23, 26, 27. The sealing assembly applied to the air duct 23 is shown in detail in FIGS. 2 and 3.

A flange 31 surrounds the upper opening 23a of the air duct 23, and a frame 32 coincides with the said flange. An expansion member 33, having a section of channel or U shape, and made of comparatively thin flexible and resilient material, for example spring steel, is secured at its edges in a gas-tight manner by clamps 34 and packing strips 35 to the flange 31 and to the frame 32.

The frame 32 also has a metal sealing strip 36 secured to it by screw studs 37, and the said sealing strip slides, during rotation of the duct members, on the surfaces of a flange 38 on and radial ribs of the regenerator 14. Rollers 39, mounted externally on the regenerator, project through the flange 38 to engage the sealing strip 36 and assist the sliding movement between the sealing strip 36 and the flange 38 and the ribs of the regenerator.

Bolts 40, spaced apart at suitable intervals around the sealing assembly, are screwed into the frames 32, and pass freely through the flange 31 on the air duct 23 and also through a second flange 41 on the air duct. Helical compression springs 43 are disposed around the bolt 40 and between the flange 41 and a cup member 45 on the bolt. Thus, the frame 32 together with the sealing strip 36 is constantly urged by the springs 43 towards the regenerator 14. Stop nuts 46 on the bolt abut the flange 41 in order to limit the movement of the bolt, and by adjustment of those nuts on the bolt it is possible to limit wear of the sealing strip 36 during an initial running-in period. The pressure of the springs 43 on the sealing strip 36 can be adjusted by rotating the screwed bolt 40 in the frame 32. Damper springs 42 are disposed between the flange 31 and other cup members 44 on the bolts.

The frame 32 and the air duct 23 also are connected to each other by swivelling connections 48 which comprise a rod 49 connected at its ends by ball-joints to brackets 50 and 51 secured, respectively, to the frame 32 and the air duct 23.

The pressure of the springs 43 around the air ducts 22, 23 of the lower rotatable duct member 20 is adjusted so that the springs do not carry much more than the weight of the sealing frame 32 and sealing strip 36, and therefore the sealing strip 36 is in relatively light contact with co-acting sealing surfaces of the regenerator 14. The main part of the necessary contact pressure is provided by the pressure difference between the air in the ducts 22, 23 and the gas in the chamber 12. In the air ducts 22, 23 the air pressure may amount to approximately 20 inches to 60 inches water gauge, whereas in the gas chamber 12 there may be a depression of approximately minus 4 inches to minus 8 inches water gauge.

Similar air and gas pressures occur in the upper air ducts 26, 27 and gas chamber 13, respectively. The springs 43 in the upper sealing assembly 30, that is, between the rotatable duct member 24 and the upper end of the regenerator 14, are adjusted so that they carry almost the complete weight of the frame 32 and the sealing strip 36. The main portion of the contact pressure is produced by the pressure difference between the air in the member 24 and the gas in the chamber 13.

A construction according to this invention provides a gas-tight seal between the stationary regenerator end surfaces and the rotating air ducts. The rotation movement of the air ducts is applied to the sealing strips and the frames therefor by carrier swivelling devices which enable the sealing frames to move axially as well as rotationally. The bolts which locate the springs do not carry the sealing frame and therefore they are not subjected to bending or jamming. A simple sealing means is provided.

What I claim and desire to secure by Letters Patent is:

1. A regenerative heat exchanger comprising a casing, a hot gas inlet chamber at the bottom of said casing, a gas outlet chamber at the top of said casing, a stationary regenerator with said casing between said chambers, a mass of plates in said regenerator providing a multiplicity of axial passages therethrough, an outlet air duct one open end of which is disposed within said gas inlet chamber, an inlet air duct one open end of which is disposed within said gas outlet chamber, rotatable air duct members above and below said regenerator having necks disposed in rotatable air and gas tight engagement with the open ends of the inlet and outlet air ducts, each rotatable air duct member having openings at its end adjacent the upper and lower faces of said regenerator whereby air emitted from said inlet air duct passes through said regenerator into said outlet air ducts, and sealing assemblies disposed around the peripheries of the openings of said rotatable air duct members comprising a sealing member, a frame attached to said sealing member, an expansion member between said rotatable air duct members and said frame, swivel joint means between said rotatable air duct members and frame for transmitting the rotational movement of said rotatable air duct members to said sealing member and resilient means urging said frame from said rotatable air duct members toward said regenerator.

2. A regenerative heat exchanger according to claim 1, wherein the swivel joint means includes at least one swivel connection between the rotatable air duct members at its periphery and said frame.

3. A regenerative heat exchanger according to claim 2, wherein each swivel connection joint means comprises a rod which has ball joints at its end respectively connected to the rotatable air duct members and to said frame.

4. A regenerative heat exchanger according to claim 1, wherein a flange surrounds the opening of said rotatable air duct members and coincides with said frame, and said expansion member comprises a thin, flexible, resilient channel-shaped member which is secured in gas-tight manner by its edges to said flange and said frame.

5. A regenerative heat exchanger according to claim 4, wherein the said resilient member comprises bolts disposed at intervals around the periphery of the rotatable air duct members, each such bolt being screwed into the frame and passing freely through flanges on the rotatable air duct members, and a helical compression spring on said bolt and located between a said flange and a stop on the bolt.

6. A regenerative heat exchanger according to claim 5 wherein an adjustable stop is provided on each said bolt so as to abut a said flange and thus limit movement of the frame towards the regenerator and wherein pressure on the frame towards the regenerator may be adjusted by rotating the screwed connection of the bolt to said frame.

7. A sealing assembly for use in regenerative heat exchangers having an outer casing, a stationary regenerator portion disposed within said outer casing air duct and associated rotatable air duct members at the ends of said casing with openings adjacent opposite faces of the regenerator portion of said heat exchanger comprising a sealing member, a frame to which said sealing member is affixed, a flange surrounding the opening of said rotatable air duct members, an expansion member between said flange and said frame attached thereto, swivel joint means between said rotatable air duct members and said frame for transmitting the rotational movement of the rotatable air duct members to said sealing member and resilient means urging said frame from said rotatable air duct members into sealing engagement with said regenerator.

8. A sealing assembly according to claim 7 wherein said expansion member comprises a thin, flexible, resilient channel-shaped member which is secured in gas-tight manner by its edges to said flange and said frame.

9. A sealing assembly according to claim 7 wherein the swivel joint means includes at least one swivel connection between the rotatable air duct members at its periphery and said frame.

10. A sealing assembly according to claim 9 wherein each swivel joint means comprises a rod which has ball joints at its ends respectively connected to the rotatable air duct members and to said frame.

11. A sealing assembly according to claim 10 wherein the said resilient member comprises bolts disposed at intervals around the periphery of the rotatable air duct members, each such bolt being screwed into the frame and passing freely through flanges on the rotatable air duct members, and a helical compression spring on said bolt and located between a said flange and a stop on the bolt.

12. A sealing member according to claim 11 wherein an adjustable stop is provided on each said bolt so as to abut a said flange and thus limit movement of the frame towards the regenerator and further wherein the pressure on the frame towards the regenerator may be adjusted by rotating the screwed connection of the bolt to said frame.

References Cited by the Examiner

UNITED STATES PATENTS

| 1,939,153 | 12/33 | Villasuso | 165—5 |
| 2,873,952 | 2/59 | Mudersbach | 165—9 |
| 2,951,686 | 9/60 | Sandman et al. | 165—9 |

FOREIGN PATENTS 763,385  12/56  Great Britain.

CHARLES SUKALO, *Primary Examiner.*

HERBERT L. MARTIN, *Examiner.*